US010972903B2

(12) United States Patent
Coureau et al.

(10) Patent No.: US 10,972,903 B2
(45) Date of Patent: Apr. 6, 2021

(54) LOADING OF SUBSCRIPTION PROFILE INTO AN EMBEDDED SIM CARD

(71) Applicant: Orange, Paris (FR)

(72) Inventors: Laurent Coureau, Morangis (FR); Jean-Marie Mele, Paris (FR); Philippe Lucas, Bievres (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/575,786

(22) PCT Filed: May 17, 2016

(86) PCT No.: PCT/FR2016/051158
§ 371 (c)(1),
(2) Date: Nov. 20, 2017

(87) PCT Pub. No.: WO2016/185129
PCT Pub. Date: Nov. 24, 2016

(65) Prior Publication Data
US 2018/0146364 A1    May 24, 2018

(30) Foreign Application Priority Data
May 21, 2015  (FR) ...................................... 1554595

(51) Int. Cl.
*H04M 3/00* (2006.01)
*H04W 8/20* (2009.01)
(Continued)

(52) U.S. Cl.
CPC ......... *H04W 8/205* (2013.01); *H04L 61/1511* (2013.01); *H04W 8/18* (2013.01);
(Continued)

(58) Field of Classification Search
CPC ....... H04W 8/205; H04W 12/08; H04W 8/24; H04W 8/18; H04W 12/04; H04L 61/1511
(Continued)

(56) References Cited

U.S. PATENT DOCUMENTS

2012/0158940 A1* 6/2012 Nishi ................ H04L 29/12066
709/223
2013/0275570 A1* 10/2013 Treuhaft ............. H04L 61/1511
709/223
(Continued)

FOREIGN PATENT DOCUMENTS

EP   2 293 525 A1   3/2011
EP   2 680 628 A1   1/2014

OTHER PUBLICATIONS

International Search Report and Written Opinion dated Aug. 16, 2016 for Application No. PCT/FR2016/051158.

*Primary Examiner* — Marcos Batista
(74) *Attorney, Agent, or Firm* — Knobbe, Martens, Olson & Bear, LLP

(57) ABSTRACT

A method is provided of installing a subscription profile, taken out with an operator of a mobile telecommunications network, on a mobile communication terminal containing an embedded module for subscriber identification. This method can include sending a domain name resolution request to a domain name server, this request including an identifier of a network server, and receiving, in response to this request, a response message containing a network address of the network server allowing the triggering of the loading of the profile. The subscription profile can then be loaded into the embedded module from a supply server of the network. A mobile terminal, a supply server and a domain name server can be configured to implement this method.

12 Claims, 5 Drawing Sheets

(51) Int. Cl.
*H04L 29/12* (2006.01)
*H04W 12/04* (2021.01)
*H04W 8/18* (2009.01)
*H04W 12/00* (2021.01)
*H04W 8/24* (2009.01)
*H04W 12/08* (2021.01)

(52) U.S. Cl.
CPC ......... *H04W 8/24* (2013.01); *H04W 12/0023* (2019.01); *H04W 12/04* (2013.01); *H04W 12/08* (2013.01)

(58) Field of Classification Search
USPC .......................................... 455/419; 370/338
See application file for complete search history.

(56) References Cited

U.S. PATENT DOCUMENTS

| | | | |
|---|---|---|---|
| 2014/0004827 A1* | 1/2014 | O'Leary | H04W 8/22 455/411 |
| 2014/0219447 A1 | 8/2014 | Park et al. | |
| 2015/0180849 A1* | 6/2015 | Nesic | H04L 63/0815 726/6 |

* cited by examiner

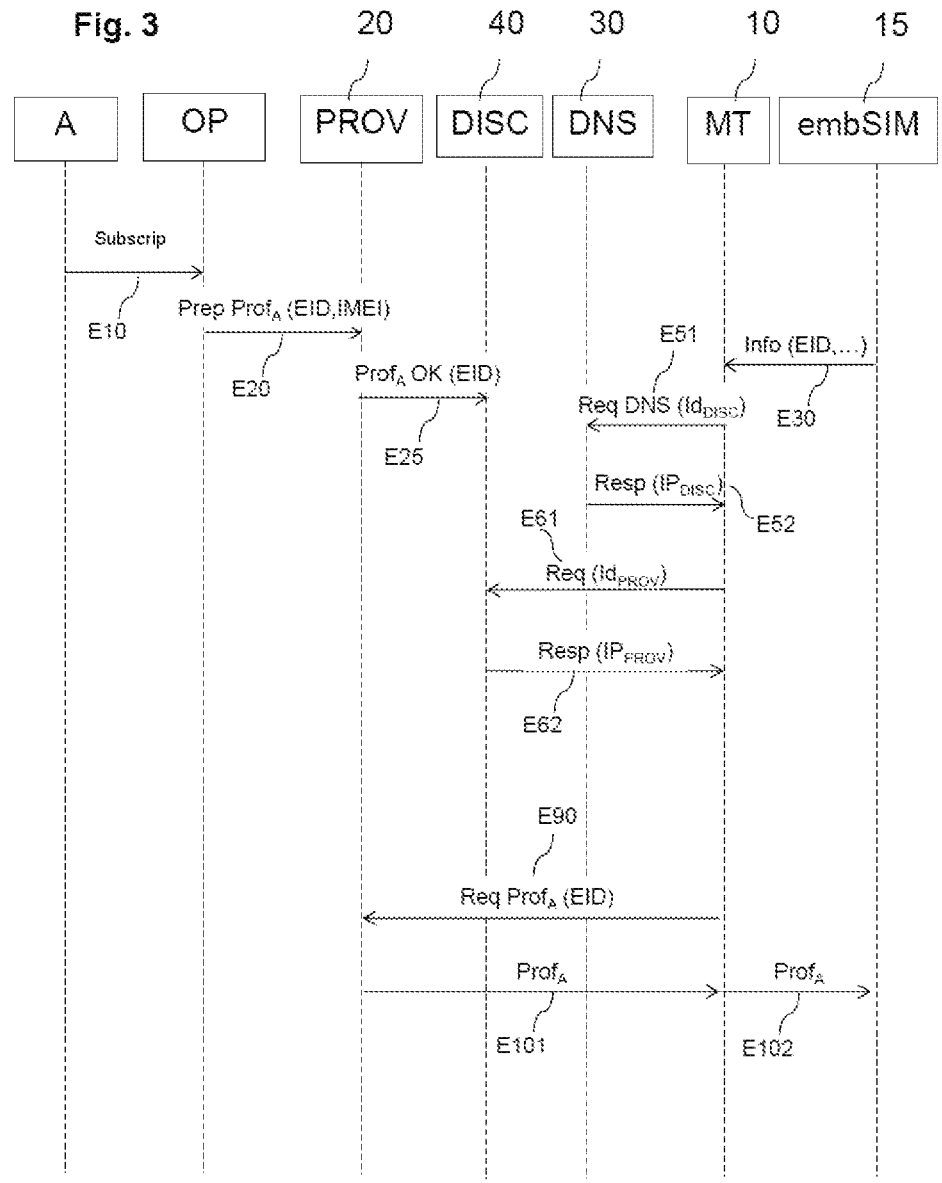

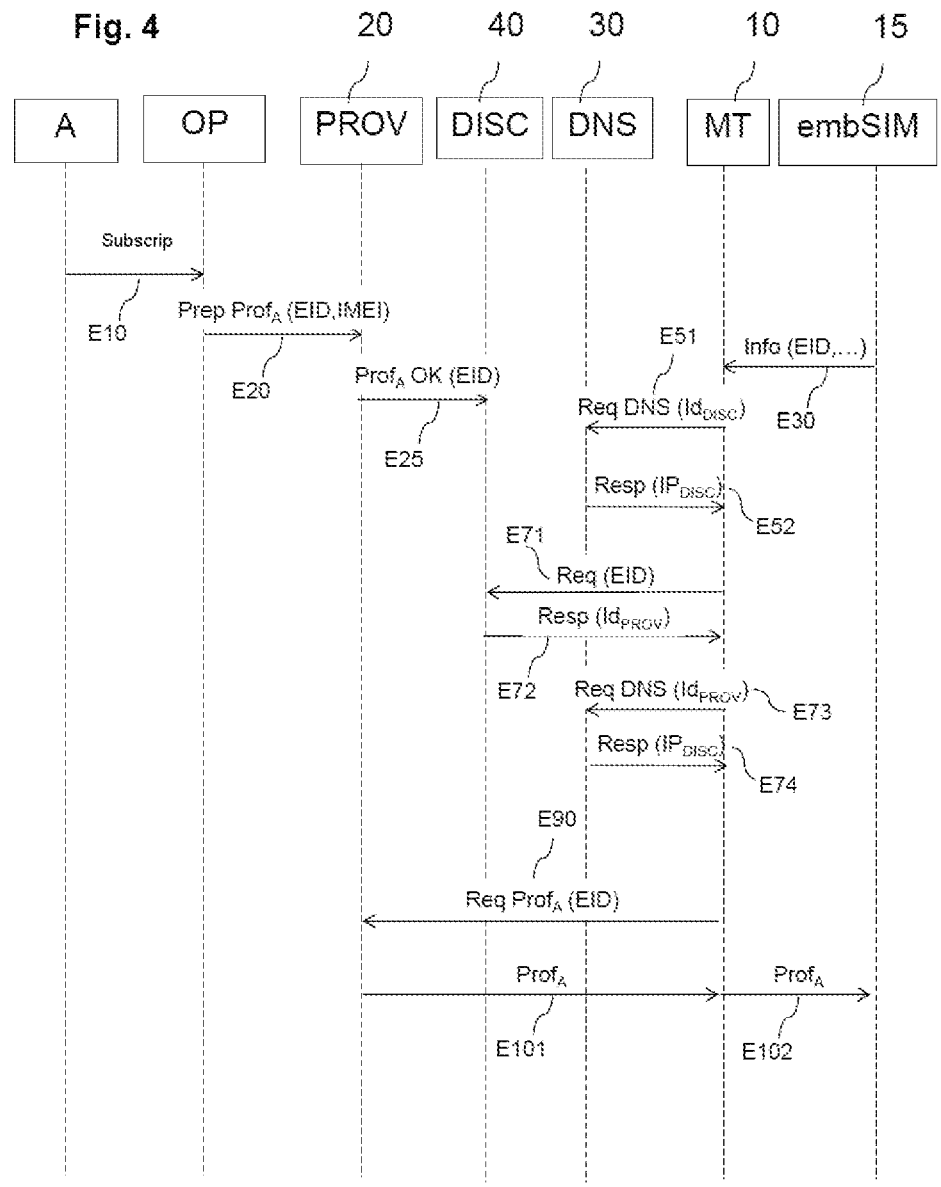

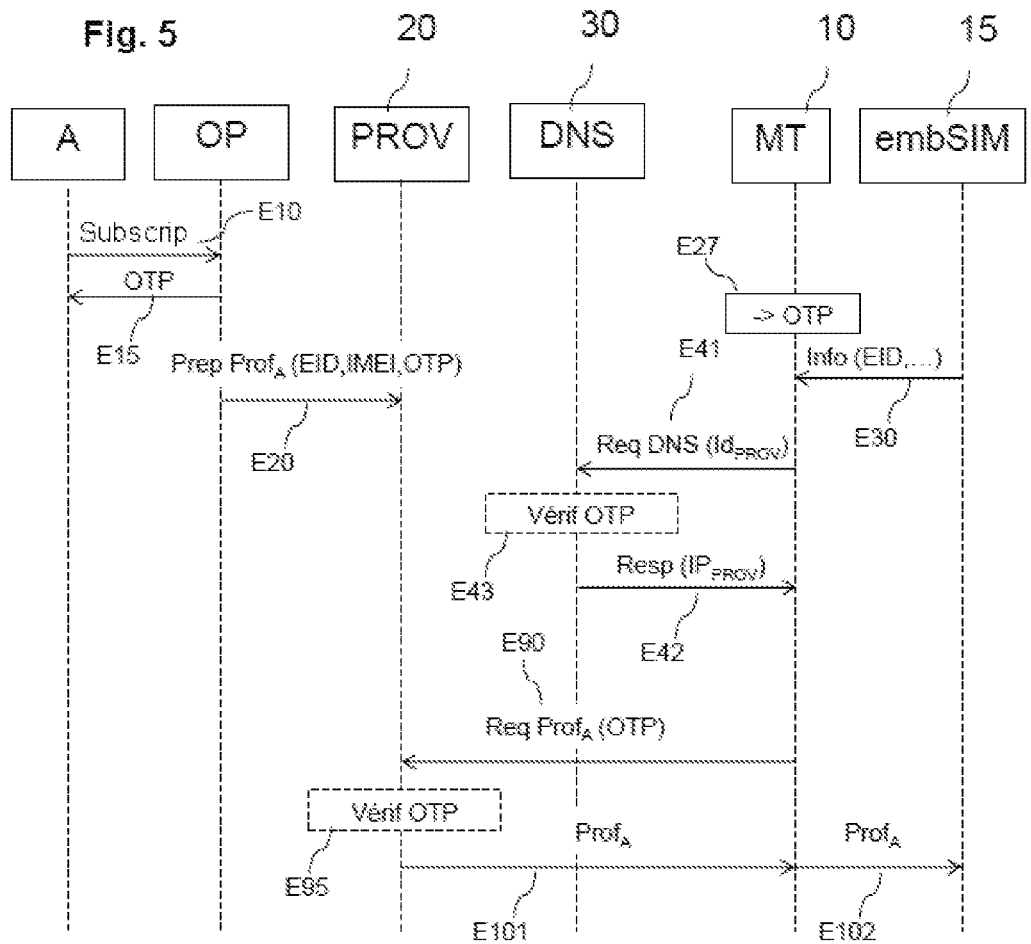

LOADING OF SUBSCRIPTION PROFILE INTO AN EMBEDDED SIM CARD

RELATED APPLICATIONS

This application is the U.S. National Phase of Application No. PCT/FR2016/051158 entitled "LOADING OF SUBSCRIPTION PROFILE INTO AN EMBEDDED SIM CARD" filed May 17, 2016, which designated the United States, and which claims the benefit of French Application No. 1554595 filed May 21, 2015.

The present invention relates to the field of mobile telecommunications, and more particularly that of the mobile elements incorporating a subscriber identification module of the embedded SIM card type.

From the first generations of cellphones to the present day, it has been standard practice for a user to have to insert a chip, called SIM card, into his or her cellphone. This SIM card is supplied physically to the user by the operator of a mobile telecommunication network to which he or she subscribes. When it is supplied to the user, this SIM card already contains in memory a subscription profile comprising elements allowing this user to be authenticated with this network in order to access the services that it offers, as a function of the subscription taken out. Thus, by virtue of the physical separation between, on the one hand, the cellphone and, on the other hand, the SIM card, the user can easily change terminal while retaining his or her SIM card, and thus stay with the same operator, or, conversely, change operator, and therefore SIM card, while retaining his or her terminal.

For a few years now however, there have been more and more mobile terminals (whether telephones or tablets) in which the SIM card is integrated (that is to say not physically separable from the terminal), and this is called an embedded SIM card. In this particular case, the mobile terminal can be bought initially by the user, for example by physically going to a point of sale of a distributor of this kind of terminal, without any subscription profile having been loaded natively in the embedded SIM card of this terminal, and therefore without the user being able to directly access a mobile network after purchasing this terminal.

When the user subsequently wants to activate a subscription, to be able to access a mobile network and thus use his terminal with mobility, the procedure can then prove not very user friendly for the user.

The user may thus have to travel again, this time to an agency of a mobile network operator of his or her choice, to obtain a subscription profile to be loaded into his or her embedded SIM card. Alternatively, the distributor or the manufacturer of the terminal may offer, on its Internet site, a list of telephone operators with which to take out a subscription, the user then being referred to the Internet site of the operator that he or she selects to be able to take out a specific subscription there, enabling him or her to obtain a corresponding subscription profile to then be downloaded.

Apart from these solutions resulting in a multiplication of the user procedures before being able to benefit from the functionalities of his or her terminal with mobility, they are tedious to manage both for the terminal distributor, which must then keep its Internet portal updated with the lists of mobile operators that may vary over time and increase exponentially (counting for example all the existing virtual mobile operators, in each country covered), and for the mobile operators which must then maintain contact with the multiple distributors of such terminals in order to be offered to the purchasers of these terminals.

The object of the present invention is to remedy the abovementioned drawbacks of the existing solutions in terms of initialization of mobile terminals with embedded SIM cards.

To this end, it proposes a method for installing a subscription profile, taken out with an operator of a mobile telecommunication network, on a mobile terminal containing an embedded subscriber identification module, comprising the loading of the subscription profile into the embedded module from a provisioning server of the mobile telecommunication network. This method further comprises, before the loading of the profile, the sending of a name resolution request to a domain name server, this request comprising an identifier of a network element allowing the triggering of the loading of the profile, the reception, in response to this request, of a response message containing a network address of the network element and the sending of a request to said network element by means of this network address in order to allow the triggering of the loading of the profile.

It is thus possible to automate the discovery of the provisioning platform where the subscription profile to be loaded into an embedded subscriber identification module is located, and therefore to avoid procedures that are useless to the clients, as well as an exchange of information that is complex to manage between operators and distributors of terminals with this type of embedded module. The installation of the operator profile of a subscriber in an embedded module of his or her terminal is thereby facilitated. This automation is also simple to implement because it relies in particular on the astute re-use of an element (a domain name server) and a mechanism (name resolution by means of such a server) that already exist and are widely deployed, but used in a totally different context. Furthermore, the re-use of this type of element and mechanism makes it possible to exploit secure mechanisms ("Secure DNS") inherent to the latter in the context of the loading of subscription profiles.

In one embodiment, the network element allowing the triggering of the loading of the profile is the provisioning server and the request sent to the network element is a request to trigger the loading of the profile containing an identifier of the embedded module and/or of the mobile terminal. This implementation allows a direct discovery of the provisioning platform where the profile to be loaded is located and thus offers an automation that is efficient and simple to implement, particularly suited to the case where the mobile terminal with embedded module is obtained directly from the operator.

According to an advantageous feature of this embodiment, the method further comprises the reception, from the embedded module, of an identifier of said embedded module, the identifier of the provisioning server being constructed from at least a part of the identifier of said embedded module.

An additional degree of automation can thus be offered, the provisioning server being able to be discovered without the subscriber having to enter all of his or her identifier in his or her terminal. This also makes it possible to ensure the confidentiality of the identifier of said embedded module when only a part thereof is used to obtain the identifier of the provisioning server.

According to another advantageous feature of this embodiment in which the identifier of the provisioning server includes a one-time password, the method further comprises the checking of this one-time password by the domain name server and/or the provisioning server.

The automation of the installation of the profile can thus be secured, and there is thus an assurance that a profile unwanted by the subscriber will not be loaded on the embedded module of his or her terminal.

In another embodiment in which the network element allowing the triggering of the loading of the profile is a discovery server distinct from the provisioning server and the request sent to this network element is a request to obtain information making it possible to send a request to trigger the loading of the profile to the provisioning server, the method further comprises the reception from the discovery server, in response to the obtention request, of a response message containing this information and the sending of a request to trigger the loading of the profile to the provisioning server.

This other implementation allows an indirect discovery of the provisioning server where the profile to be loaded is located, via a discovery server capable of referring the mobile terminal to different provisioning platforms as a function of the operator with which a subscription is taken out. This offers an automation that is more flexible and appropriate to a multi-operator context, particularly suited to the case where the mobile terminal with embedded module has not been obtained directly from a specific operator.

According to an advantageous feature of this embodiment, the discovery server is a domain name server, the request to obtain information making it possible to send a request to trigger the loading of the profile to the provisioning server is a name resolution request containing an identifier of the provisioning server and the information is a network address of the provisioning server, the request to trigger the loading of the profile being sent by means of said network address.

This allows a simple automation of the installation of a profile in a multi-operator context by astutely re-using, to implement the intermediate discovery server, an element (a domain name server) and a mechanism (name resolution by means of such a server) that already exist but are used in a totally different context.

According to another advantageous feature of this embodiment in which the request to obtain information contains an identifier of the embedded module and said information is an identifier of the provisioning server, the method further comprises the sending, to the domain name server, of a domain name resolution request containing the identifier of the provisioning server and the reception, in response to said resolution request, of a response message containing the network address of the provisioning server, the request to trigger the loading of the profile being sent by means of the network address.

This allows an automation of the installation of a profile in a multi-operator context by means of a generic intermediate discovery server, which is not specifically of DNS server type, the function of resolution of the addresses of the different network elements involved then being maintained on a domain name server.

Another subject of the invention relates to a mobile terminal comprising an embedded subscriber identification module and a processing module capable of installing a subscription profile, taken out with an operator of a mobile telecommunication network, in the embedded module. The processing module is configured to transmit a domain name resolution request comprising an identifier of a network server allowing the triggering of the loading of the profile, intended to be transmitted to a domain name server and, following the reception of a message in response to this resolution request containing a network address of a network element allowing the triggering of the loading of the profile, transmit a request to this network element in order to trigger the loading of the subscription profile from a provisioning server.

Another subject of the invention relates to a domain name server comprising a storage module in which network addresses of elements can be stored in association with domain names and a processing module that can consult this storage module, this processing module being configured to, following the reception of a domain name resolution request containing an identifier of a network element allowing the triggering of the loading of the profile, transmitted from a mobile terminal containing an embedded subscriber identification module:
check to see if a network address corresponding to said identifier is stored in the storage module; and when this check is positive, transmit said network address to the mobile terminal in order to allow said terminal to transmit to said network element a request allowing the loading of a subscription profile from a provisioning server.

Another subject of the invention relates to a discovery server comprising a storage module and a processing module that can consult this storage module, the processing module being configured to, following the reception of a request to obtain information making it possible to send a request to trigger the loading of a subscription profile to a provisioning server, transmitted from a mobile terminal containing an embedded subscriber identification module:
check to see if this information is stored in the storage module; and
when this check is positive, transmit this information to the mobile terminal in order to allow said terminal to transmit to the network element a request to load the subscription profile from the provisioning server.

Another subject of the invention relates to a provisioning server comprising a storage module and a processing module that can consult this storage module, the processing module being configured to, following the reception of a request to load a subscription profile transmitted from a mobile terminal comprising an embedded subscriber identification module, this request containing an identifier of the embedded module and/or of the terminal:
check, by means of the identifier, to see if an indication that a subscription profile is available for the loading for said embedded module is stored in the storage module; and
when this check is positive, transmit the subscription profile to the mobile terminal.

Another subject of the invention relates to a computer program comprising code instructions for implementing at least one of the steps of the above, when this program is executed by a processor of a mobile terminal or of a server. Another subject of the invention relates also to a storage medium, that can be read by a mobile terminal or a server, in which is stored the above.

Other features and advantages of the invention will become apparent on reading the following detailed description of particular embodiments, given as nonlimiting examples, and the attached figures in which:

FIGS. 2 to 5 illustrate the steps of a subscription profile installation method according to different embodiments of the invention;

Figure 1:
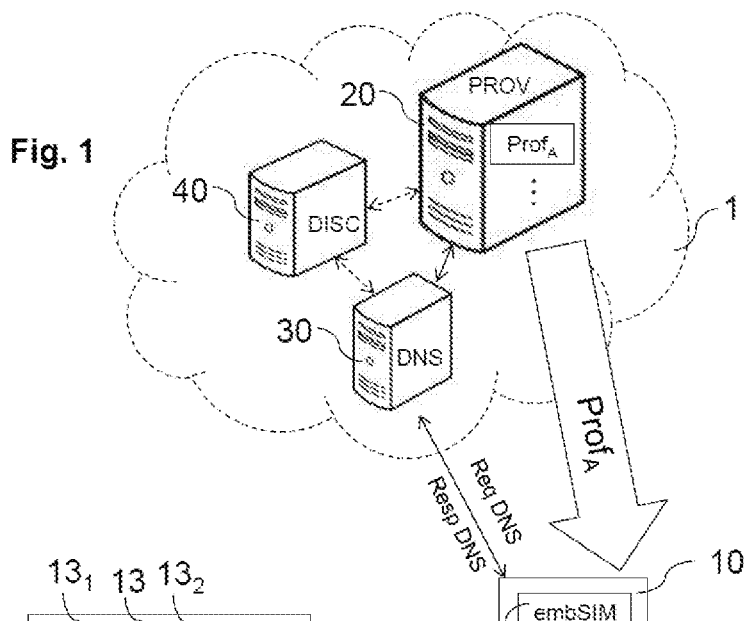
FIG. 1 is a block diagram illustrating a mobile telecommunication system allowing the installation, in an embedded module of a mobile terminal, of a subscription profile with a telecommunications operator.

Reference is made first of all to FIG. 1 in which a mobile telecommunication system is illustrated that allows the installation, in an embedded module of a mobile terminal, of a subscription profile with a telecommunications operator.

This system comprises, on the one hand, a mobile terminal 10 (that can equally well be a cellphone, a smartphone, a table or a laptop computer, by way of examples) comprising in particular an embedded subscriber identification module 15 (typically formed by a chip containing a microcontroller associated with a memory) integrated in the terminal 10 and intended to store information relating to a subscriber A of a mobile network, such as the identifiers of this subscriber A (for example his or her IMSI number) and of the mobile telecommunications operator OP with which he or she has subscribed (for example the MCC and MNC numbers of the operator OP). Such an embedded module 15, inseparable from the terminal 10 unlike a conventional SIM card, is usually referred to by the terms "embedded SIM" or "eUICC".

The system comprises, on the other hand, a communication network 1 comprising a certain number of network elements 20, 30, 40 allowing the loading, into the embedded module 15 integrated in the terminal 10, of a subscription profile taken out by the subscriber A with his or her mobile operator OP. These different network elements 20, 30, 40 may belong to one and the same communication network, entirely managed by one and the same operator OP, or be situated in different communication networks managed by different operators, then forming the network 1 illustrated in FIG. 1.

In particular, the system comprises, on the one hand, a first network element 20 used to provision subscription profiles, typically implemented in the form of a server, in which are stored the subscription profiles of the subscribers to one and the same operator. The subscription profile $Prof_A$ takes the form of a digital file that can notably comprise the elements of authentication of the subscriber with respect to the operator OP (secret key(s) associated with this specific subscription), the identifier(s) of the subscriber (for example IMSI), as well as the services to which the subscriber A has subscribed with the operator OP or with a third-party service provider. The terminal 10 can download the profile $Prof_A$ from this provisioning server 20, by sending a request for this purpose to the network address of this server 20.

It also comprises a second network element 30, typically implemented in the form of a server, that can be interrogated initially by the terminal 10 to obtain information allowing the latter to access, in a second stage, directly or indirectly depending on the embodiment used, the provisioning server 20 in order to trigger the loading of the subscription profile in the embedded module 15.

The server 30 is in particular a server called "domain name server", or even DNS server, storing a table of network addresses (typically IP addresses) associated respectively with domain names, so that, when this server 30 receives, from the terminal 10, a domain name resolution request identifying a particular domain name, this server 30 searches in its table for a network address associated with this domain name and returns to the terminal 10 a response containing this network address if it exists in this table.

The system can also optionally comprise a third network element 40 that is used to discover the provisioning server 20, typically implemented in the form of a server, such a discovery server 40 being able to be used in the present context to access the provisioning server 20, as will be seen later.

Figure 2:
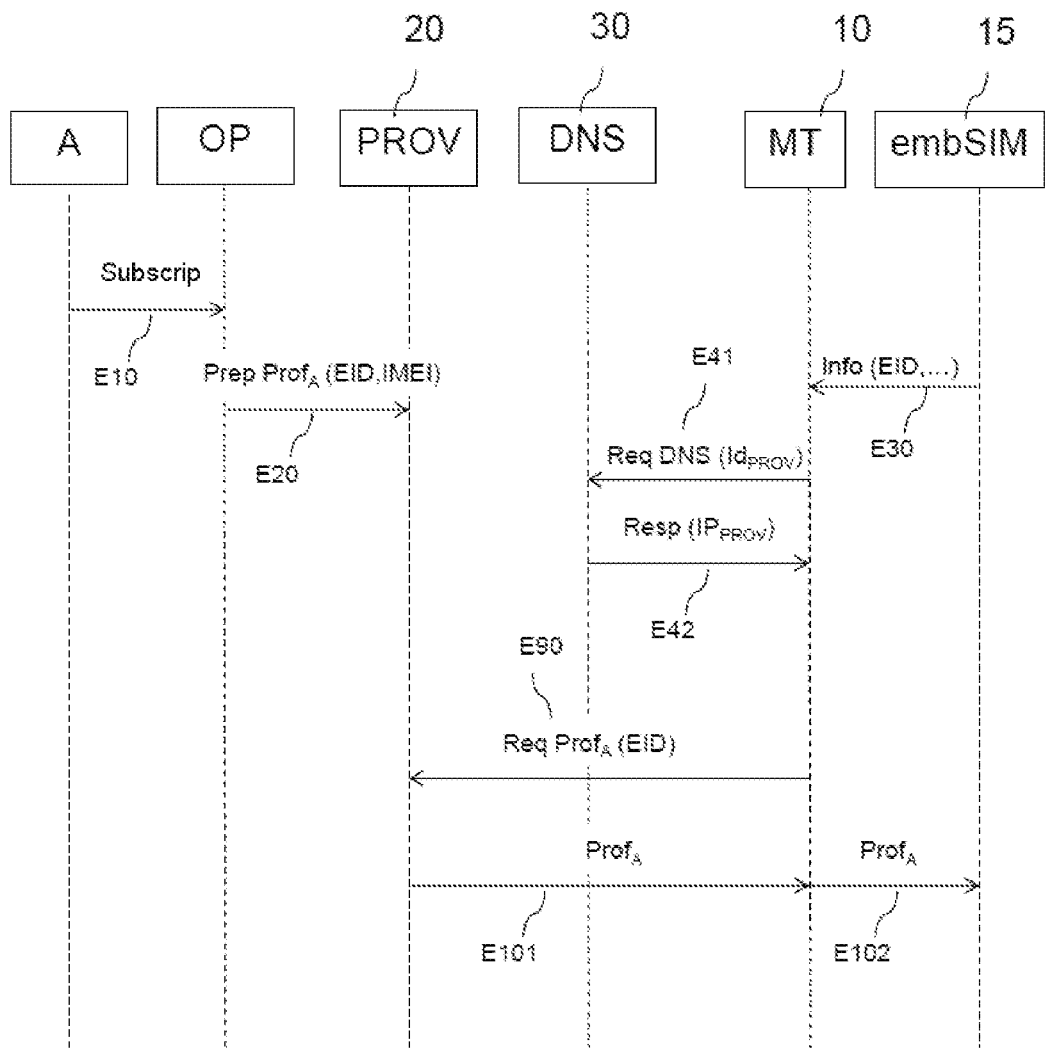

Reference is now made to FIG. 2 which illustrates a subscription profile installation method according to a first embodiment of the invention.

In this method, a user A first takes out (step E10) a subscription with a mobile operator OP, in order to allow him or her to access services offered by this operator by means of his or her mobile terminal 10, for example physically by going to an agency, or remotely via a web portal accessed from a computer or another communication terminal. During this subscription procedure, information linked to the embedded module 15 and to the terminal 10 is exchanged with the operator OP, such as an identifier of the embedded module 15 (a unique serial number, e.g. its identifier EID) and an identifier of the terminal 10 (a unique serial number, e.g. its identifier IMEI).

The operator OP then sends (step E20) a request to the provisioning server 20 instructing it to prepare the subscription profile $Prof_A$ associated with the subscriber A, according to the services subscribed to by this subscriber A, this request being able to include the identifiers of the embedded module 15 (e.g. EID), of the terminal 10 (e.g. IMEI) or of the subscriber A (e.g. IMSI), or even any combination of these identifiers, in order in particular to allow the operator OP to associate the subscription profile $Prof_A$ prepared specifically for the embedded module 15 with the subscriber A in particular. The provision of the identifier of the embedded module 15 (e.g. EID) makes it possible to prepare the subscription profile for a dedicated embedded module 15, and thus to avoid the "cloning" of this profile.

Once the file of the subscription profile $Prof_A$ has been updated and prepared by the server 20, it is stored by this server 20 and thus is ready to be downloaded into the embedded module 15. A table of subscription profiles can be updated at this stage in this server 20, indicating the availability of this profile $Prof_A$ for loading in association with the identifier received in the request.

Subsequently, following a trigger event on the side of the terminal 10, for example when the subscriber A initializes his or her terminal 10, or, in the case where this terminal 10 has already been initialized, during an automatic checking process launched by the terminal 10, or even on a request initiated by the subscriber A him or herself on his or her terminal 10, the terminal 10 goes to contact the domain name server 30 to be able to access the provisioning server 20.

For this, optionally, the embedded module 15 can first transmit (step E30), to the terminal 10, its identifier EID, in order for the terminal 10 to use this identifier in its exchanges with the servers 20 and 30.

The terminal 10 does not at this stage know the network address of the provisioning server 20, but it knows the network address $IP_{DNS}$ of the domain name resolution server 30, this address having been configured previously in the terminal 10 in order to allow it to resolve any kind of domain name (for example when browsing on the Internet).

The terminal 10 then uses this address $IP_{DNS}$ to transmit (step E41) to this server 30 a name resolution request, typically in DNS request format, this request containing in particular an identifier of a network element that can be used to trigger the loading of the profile, in this case the identifier $\text{Id}_{PROV}$ of the provisioning server 20 itself in the present embodiment.

As an example, this identifier $\text{Id}_{PROV}$ can take the form of a name in DNS format of the provisioning.platform.domain.tld type in which:
"provisioningplatform" is an identifier of the subdomain of the network in which the provisioning server is located;
"domain" is a registered identifier (e.g. the name) of the domain of the network in which the provisioning server is located;
"ltd" is a generic identifier (e.g. the name) of the domain on which the provisioning server resides.

The identifier of the server 20 can be entered in the terminal 10 by the subscriber A him or herself, if he or she knows it in full. Alternatively, the subscriber A can simply enter a part of this identifier if he or she knows it, or else enter a code identifying the mobile operator OP with which he or she has subscribed (which can be the name of this operator), the terminal 10 then being able to use this information, and possibly automatically complete it, to obtain the complete identifier of the server 20 and insert it into the name resolution request.

Alternatively, the identifier of the server 20 can be obtained from the identifier of the embedded module 15, when the latter has been previously transmitted from the module 15 to the terminal 10 (step E30).

Thus, when this identifier takes the form of an identifier EID, this identifier EID notably comprises identifiers of the country of manufacture and of the constructor of the embedded module, a number associated with the provisioning server 20, as well as a serial number. Out of this information, the identifiers of the country of manufacture and of the constructor, as well as the number associated with the server 20, can be used by the terminal 10 to construct the identifier of the server 20 to be resolved by the server 30. Thus, by way of example, when the identifier EID contains the sequence '033001006' to indicate that the embedded module 15 was manufactured in France ('033'), by a constructor identified by the sequence '001', and that an associated provisioning server has the number '006', this information can be inserted into the identifier of the server 20 transmitted to the server 30. The limited quantity of information extracted in the identifier EID to construct the identifier of the server 20 makes it possible to ensure the confidentiality of this identifier EID in the network.

Following the reception of this request, the server 30 searches for a network address corresponding to this identifier and, if it finds one stored in its network address table, transmits (step E42) this network address $\text{IP}_{PROV}$ to the terminal 10 in a response message.

Following the reception of this response, the terminal 10 extracts from this response the network address $\text{IP}_{PROV}$ of the provisioning server 20 and then uses this network address $\text{IP}_{PROV}$ to transmit (step E90) to this server 20 a request to trigger the loading of the profile $\text{Prof}_A$, this request containing an identifier of the embedded module 15 (e.g. its EID) when it has been supplied to the mobile terminal 10, that can possibly be completed with an identifier of the terminal 10 (e.g. its IMEI).

The transmission (step E90) of this request containing an identifier of the embedded module 15 can advantageously be done through a secured link (e.g. an encrypted channel making it possible to protect this identifier which constitutes sensitive information) between the provisioning server 20 and the terminal 10 once the latter has the network address of the server 20, before this transmission. The secured link can be set up according to the TSL/SSL protocol. This request is then transmitted via this secured link, which makes it possible to safely check the authenticity of the embedded module 15.

The server 20 then checks to see if a file of the subscription profile $\text{Prof}_A$ is awaiting loading, by looking up a table storing the available profiles associated with identifiers of EID type. If the server 20 detects an available profile corresponding to the identifier received from the terminal, it recovers the profile $\text{Prof}_A$ of the subscriber A from the subscription profiles that it has, and transmits (step E101) this profile $\text{Prof}_A$ (in the form of a digital file) to the terminal 10 in return. This profile $\text{Prof}_A$ is then loaded, then installed, by the terminal 10 in the embedded module 15 (step E102).

If, however, the server 20 does not detect any profile $\text{Prof}_A$ awaiting loading corresponding to the identifier EID received, this server 20 can return to the terminal 10 a request for redirection to an Internet portal allowing the user A of the terminal 10 to select an offering of the operator OP. Once the parameters of the offering have been chosen by the user A, the server 20 transmits the corresponding profile $\text{Prof}_A$ to the terminal 10, in order for this profile to be loaded and installed in the embedded module 15.

Reference is now made to FIG. 3 which illustrates a subscription profile installation method according to a second embodiment of the invention.

Here, contrary to the preceding embodiment, the procedure for access from the terminal 10 to the provisioning server 20 is done indirectly, via a discovery server 40 distinct from the provisioning server 20. Like the server 30, this server 40 can be implemented in the form of a domain name server, called DNS server, whose main function is to return a network address of a network element on reception of a name resolution request designating this element by means of an identifier (e.g. a DNS name).

In this embodiment, the method starts with the preliminary taking out by the user A of a subscription with the operator OP, and the preparation of the subscription profile $\text{Prof}_A$ of the subscriber A by the server 20, similarly to the preceding embodiments (steps E10, E20).

Once the profile $\text{Prof}_A$ has been prepared by the server 20, this server 20 transmits (step E25) to the discovery server 40 a message signaling that a subscription profile corresponding to the embedded module identified by its identifier (e.g. its EID number), and possibly also with the name of the associated telecommunications operator OP, is available for downloading in the server 20.

This message can contain a generic identifier simply identifying the server 20 without identifying the embedded module 15 affected by the subscription for which the profile has been prepared, or else a more specific identifier (e.g. EID) designating the embedded module 15 for which this profile $\text{Prof}_A$ has been prepared. The server 40 can then store such an identifier as indication that a subscription profile is awaiting loading, in association with the network address $\text{IP}_{PROV}$ of the server 20 and an identifier $\text{Id}_{PROV}$ of this server 20. The table stored in the discovery server 40 can then take the following form, by way of example illustrating different nonlimiting possible cases:

TABLE 1

| Provisioning server (PROV) | Provisioning server identifier ($Id_{PROV}$) | Server network address ($IP_{PROV}$) | Subscription profile awaiting loading |
|---|---|---|---|
| PROV1 | $Id_{PROV1}$ | 10.XXX.XX.001 | OK |
| PROV2 | $Id_{PROV2}$ | | EID1 |
| | | | EID2 |
| | | | EID2 |
| PROV3 | $Id_{PROV3}$ | 10.XXX.XX.003 | |

This table indicates:

The availability of an indeterminate number (at least equal to one) of subscription profile(s) awaiting loading on the provisioning server PROV1, by means of a generic indicator ('OK'), the network address $IP_{PROV}$ of this first server being known to the server 40 and thus being able to be returned on request to the terminal.

The availability of a determined number (here three) of subscription profiles awaiting loading on the provisioning server PROV2, for embedded modules identified by the identifiers EID1, EID2, EID3, the network address $IP_{PROV}$ of this second server PROV2 not being known to the server 40.

The non-availability of any subscription profile awaiting loading on the provisioning server PROV3, indicated by means of a generic indicator (blank field in this particular case), either because no ready subscription profile has been signaled to the server 40 by the provisioning server PROV3 at this stage, or because a previously ready subscription profile has already been loaded in the embedded module 15 (the corresponding field in the table 1 then having been deleted to signal this loading carried out).

This table can also be reduced to a simple list respectively associating embedded module identifiers (e.g. EID) for which a subscription profile is awaiting loading with identifiers of provisioning servers ($Id_{PROV}$) on which these profiles are stored.

Then, following a trigger event on the side of the terminal 10, of the type of those described previously, the terminal 10 goes to contact the domain name server 30 to be able to address the discovery server 40, which will allow it to then access the provisioning server 20.

To do this, optionally, the embedded module 15 can first transmit (step E30) to the terminal 10 its identifier EID, in order for the terminal 10 to use this identifier in its exchanges with the server 30.

The terminal 10 uses the address $IP_{DNS}$ (configured previously in the terminal 10) to transmit (step E51) to this server 30 a domain name resolution request, typically in DNS request format, this request containing in particular an identifier of a network server that can be used to trigger the loading of the profile, in this case the identifier $Id_{DISC}$ of the discovery server 40 in the present embodiment.

As an example, this identifier $Id_{DISC}$ can here take the form of a name in DNS format of the discoverygateway.domain.tld type in which:

"discoverygateway" is an identifier of the subdomain of the network 1 in which the discovery server 40 is located;

"domain" is a registered identifier (e.g. the name) of the domain of the network 1 in which the discovery server 40 is located;

"ltd" is a generic identifier (e.g. the name) of the domain on which the discovery server 40 resides.

Like the preceding embodiment, the identifier $Id_{DISC}$ of the server 40 can be entered in the terminal 10 by the subscriber A him or herself, if he or she knows all of it. Alternatively, the subscriber A can simply enter a part of this identifier that he or she knows, or else simply enter a code identifying the mobile operator OP with which he or she has subscribed (or even the name of this operator), the terminal 10 then being able to use this information, and possibly complete it automatically, to obtain the complete identifier of the server 40.

The identifier of the server 40 can be obtained from the identifier of the embedded module 15, when the latter has been previously transmitted from the module 15 to the terminal 10 (optional step E30). Thus, when this identifier takes the form of an identifier EID, this identifier EID can include a sequence (for example '033001006') comprising identifiers of the country of manufacture ('033') and of the constructor ('001') of the embedded module, as well as a number ('006') corresponding to the discovery server 40, which can be used by the terminal 10 to construct the identifier of the server 40 to be resolved by means of the server 30, without having to disclose all of the EID to the network 1.

Following the reception of this request, the DNS server 30 searches for a network address corresponding to this identifier $Id_{DISC}$ and, if it finds one stored in its address table, transmits (step E52) this network address $IP_{DISC}$ to the terminal 10 in a response message.

Following the reception of this response, the terminal 10 extracts from the response the network address $IP_{DISC}$ of the discovery server 40 and then uses this address $IP_{DISC}$ to transmit (step E61) to this server 40 a request to obtain information making it possible to send a request to trigger the loading of the profile to the provisioning server.

In the present embodiment, the discovery server 40 is itself a DNS server and this request can take the form of a name resolution DNS request containing an identifier $Id_{PROV}$ of the provisioning server 20 targeted in particular by the terminal 10.

The discovery server 40, receiving this request sent by the terminal 10, then checks in a storage table as illustrated previously to see if there is a provisioning server associated with an indication that a profile $Prof_A$ is available for loading in this provisioning server, for example when the identifier $Id_{PROV}$ received in the request is associated with such an indication in this table (see example of the server PROV1 in table 1).

If such is not the case (see example of the server PROV3 in table 1), the discovery server 40 transmits to the terminal 10 a response message indicating that no subscription profile is awaiting loading, either because it has not yet been prepared, or because it has already been loaded in the embedded module 15.

If such is the case, the discovery server 40 returns (step E62) to the terminal 10 a response message containing a network address $IP_{PROV}$ associated in the table of the server 40 with the identifier $Id_{PROV}$ received from the terminal, of the server 40 in which the profile $Prof_A$ ready for loading is stored.

At this stage, the terminal 10 then has the network address $IP_{PROV}$ of the provisioning server 20. It can use this address to transmit to the server 20 a request triggering the loading of the profile $Prof_A$ in the way described previously (steps E90, E101, E102).

Reference is now made to FIG. 4 which illustrates a subscription profile installation method according to a third embodiment of the invention.

This embodiment is an alternative to the preceding one in which the discovery server is not necessarily a DNS server, and therefore does not directly return the network address $IP_{PROV}$ of the server 40 to the terminal 10. The steps E10 to E52 are thus similar to those illustrated in FIG. 3.

By contrast, once it has obtained the network address $IP_{DNS}$, the terminal 10 transmits (step E71) to this server 40 a request to obtain information making it possible to send a request to trigger the loading of the profile to the provisioning server.

However, this request is not necessarily a name resolution request. It contains an identifier which does not target a particular provisioning server, for example an identifier associated with the embedded module 15 such as its complete EID, or a part of this identifier EID to ensure the confidentiality of this EID in the network. This identifier enables the discovery server 40 to check in a storage table as illustrated previously to see if there is a provisioning server associated with an indication that a profile $Prof_A$ is available for loading in this provisioning server, for example when the identifier EID or its part received in the request corresponds to an identifier EID stored in this table (see example of the server PROV2 in table 1).

When such is the case, the discovery server 40 returns (step E72) to the terminal 10 a response message containing an identifier $Id_{PROV}$, associated in the table of the server 40 with the identifier EID received from the terminal, of the server 20 in which the profile $Prof_A$ is stored ready for loading.

The terminal 10 can then extract this identifier $Id_{PROV}$ and insert it into a new name resolution request transmitted (step E73) to the DNS server 30 to receive in return (step E74) the network address $IP_{PROV}$ of the server 20, which it can then use to transmit to the server 20 a request triggering the loading of the profile $Prof_A$ in the way described previously (steps E90, E101, E102).

Reference is now made to FIG. 5 which illustrates a subscription profile installation method according to a fourth embodiment of the invention.

This fourth embodiment is similar to the first embodiment in that it does not use a discovery server 40. It is distinguished therefrom however by the use of an additional code to allow the loading of the subscription profile.

This code can in particular be a temporary, one-time code ("One-Time Password"), denoted OTP in FIG. 4, that the subscriber A supplies to the terminal 10 to launch the loading process.

In this embodiment, the method always starts with the user A first taking out a subscription with the operator OP. However, at this stage, the operator OP also supplies an OTP code to the subscriber A (step E15), either by means of a letter sent to the subscriber A, or by means of a bar code that can be scanned by the terminal 10 of the subscriber A, for example.

The operator OP also sends a request to prepare the subscription profile of the subscriber A to the server 20 in order to prepare the profile $Prof_A$, in a way similar to the preceding embodiments, this request possibly containing the OTP code supplied to the subscriber A, which is then stored by the server 20 in association with the prepared profile $Prof_A$, in order to allow a subsequent check.

Next, following a trigger event on the side of the terminal 10, of the type of those described previously, the user enters (step E27) the OTP code on his or her terminal 10.

According to a first variant in which the OTP code is checked by the server 20, the terminal 10 at this stage obtains the network address $IP_{PROV}$ of the provisioning server 20, either directly from the domain name resolution server 30 (steps E41 and E42, similar to FIG. 2), or indirectly via a discovery server 40 (see steps E51 to E62 of FIG. 3). The terminal 10 then uses this network address $IP_{PROV}$ to transmit (step E90) a request to trigger the loading of the profile $Prof_A$, this request here containing the OTP code entered by the subscriber A.

Following the reception of this request, the provisioning server 20 then checks (step E95) the validity of the OTP code, after possibly having checked that the subscriber A has indeed subscribed first to an offer corresponding to a subscription profile awaiting loading.

If the OTP code is still valid (i.e. if it has not expired) and the subscriber A has indeed subscribed to an offering, the server 20 sends the profile $Prof_A$ to the terminal 10 in order to load it and install it in the embedded module 15, as described previously (steps E101, E102). Once this operation has been performed, the OTP code can be invalidated by the server 20, before even waiting for its expiry, in order to avoid having another profile loading request being authorized with this same code.

If the OTP code is not or is no longer valid, a redirection message (not illustrated) can be transmitted to the terminal 10 in order to redirect the latter to an Internet portal of the operator OP making it possible to select the desired offering.

According to another variant, once the OTP code has been entered by the subscriber A, the identifier $Id_{PROV}$ of the server 20 can be constructed by the terminal 10 by means of this OTP code, for example according to a DNS name format of the otp.provisioning.platform.domain.tld type in which "otp" is the OTP code entered by the subscriber A and the other parameters are those described in relation to the first embodiment.

The domain name server 30, receiving a name resolution request containing such an identifier, can then extract the OTP code from this identifier and check the validity of this code (step E43), by comparing it with the OTP code supplied to the subscriber A that the operator has transmitted previously to the server 30. It then returns a response containing the network address $IP_{PROV}$ only if this code is valid, in which case the rest of the process is similar to that described previously.

Figure 6:
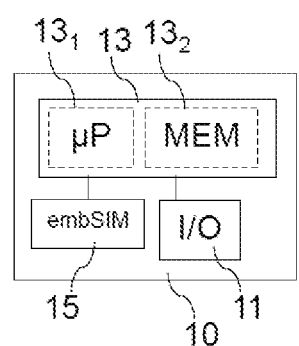
FIG. 6 illustrates a mobile terminal according to an embodiment of the invention.

Reference is now made to FIG. 6 which illustrates a mobile terminal according to an embodiment of the invention.

This mobile terminal 10 comprises:
a communication module 11, typically implemented in the form of a radio interface, that is used to connect the terminal 10 to a mobile communication network, particularly to transmit messages such as the requests described previously, generated by the processing module 13, to the network elements 20 to 40 and receive responses from these elements to supply them to the module 13 for processing, as well as the profile $Prof_A$ to be loaded in the embedded module 15 hereinbelow;
a processing module 13, typically implemented in hardware terms by a processor 131 associated with a memory $13_2$ (itself consisting of a random access memory and a read only memory, for example), configured to generate the requests described previously, intended to be transmitted to the network elements 20 to 40, and to process the responses to these requests received from these elements;
an embedded subscriber identification module 15, typically formed by a chip containing a microcontroller and a memory, integrated in the terminal 10 and intended to store information relating to a subscriber A of a mobile network, such as the identifiers of this subscriber A (i.e. his or her IMSI number) and of the mobile telecommunications operator OP with which he or she has subscribed (for example the MCC and MNC numbers of the operator OP). Such a module 15, inseparable from the terminal 10 unlike a conventional SIM card, is usually referred to by the terms "embedded SIM" or "eUICC".

Figure 7:
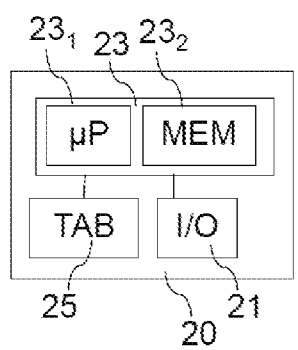
FIG. 7 illustrates a network element, of provisioning server type, according to an embodiment of the invention.

Reference is now made to FIG. 7 which illustrates a first network element of provisioning server type 20, according to an embodiment of the invention.

This provisioning server 20 comprises:

a communication module 21, typically implemented in the form of a network communication interface, that is used to connect the server 20 to the other elements of the network in which this server can be installed, as well as to mobile terminals via a mobile access network, particularly to receive a subscription profile loading request as described previously, transmitted by the mobile terminal 10, and transmit a subscription profile Prof$_A$, recovered by the processing module 23 described hereinbelow, to this terminal 10;

a processing module 23 (typically implemented in hardware terms by a processor 23$_1$ associated with a memory 23$_2$, itself consisting of a random access memory, called RAM, and a read only memory, called ROM), configured to consult a storage module 25 in order to retrieve therefrom a subscription profile ready to be downloaded and supply it, if necessary, to the terminal 10 by means of the communication module 21. This module 23 can also be configured to check the validity of a one-time code contained in a profile loading request received from the terminal 10;

a storage module 25 (for example of read only memory type, called ROM) in which can be stored subscription profiles (including, for example, the authentication data of the subscriber, all of the services taken out for this subscriber, the operator applications making it possible to ensure the service to the subscriber), in digital file form, as well as indications that a subscription profile Prof$_A$ is ready to be loaded, for example in the form of a table in which, for each profile available for loading, an indication is inserted in association with an identifier of the embedded module on which this profile can be loaded, this table being able to be consulted by the module 23 following the reception of a loading request emanating from the terminal 10. This module 25 can be separate from the processing module 23 or integrated with the memory 23$_2$ of this processing module.

Figure 8:
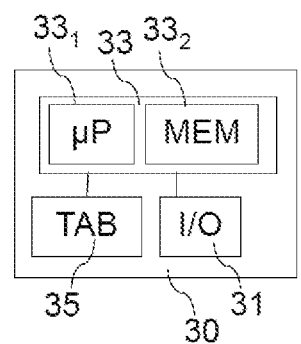
FIG. 8 illustrates a network element, of domain name server or discovery server type, according to an embodiment of the invention.

Reference is now made to FIG. 8 which illustrates a second network element of the domain name server 30 or even discovery server 40 type, according to an embodiment of the invention.

This domain name server 30 comprises:

a communication module 31, typically implemented in the form of a network communication interface, that is used to connect the server 30 to the other elements of the network in which this server can be installed, and to mobile terminals via a mobile access network, particularly to receive a domain name resolution request as described previously, sent by the mobile terminal 10, and transmit in return a response message containing a network address (IP$_{PROV}$ or IP$_{DESC}$) to this terminal 10;

a processing module 33 (typically implemented in hardware terms by a processor 33$_1$ associated with a memory 33$_2$, itself consisting of a random access memory, called RAM, and a read only memory, called ROM), configured to consult the storage module hereinbelow in order to recover therefrom the network address IP$_{PROV}$ (respectively IP$_{DESC}$) corresponding to an identifier Id$_{PROV}$ (respectively Id$_{DESC}$) of a network server inserted into the resolution request received by the module 31, and, if necessary, insert this network address into a response message to be supplied to the terminal 10 by means of the communication module 31. This module 33 can also be configured to check the validity of a one-time code contained in the resolution request received from the terminal 10;

a storage module 35 (for example of read only memory type, called ROM) in which can be stored network addresses (e.g. IP addresses) of elements associated with identifiers of domain name type, for example in the form of a table listing these elements. This storage module 35 is configured to also contain the network address IP$_{PROV}$ of the provisioning server 20 (respectively the network address IP$_{DESC}$ of the discovery server 40) mapped with an identifier Id$_{PROV}$ of this server 20 (respectively an identifier Id$_{DESC}$ of this server 40). It can be separate from the processing module 33 or integrated with the memory 33$_2$ of this processing module.

The discovery server 40 comprises modules similar to the domain name server 30, the only difference being that the storage module can store, in addition to network addresses, network identifiers to be returned to the terminal 10 upon interrogation therefrom.

The modules 13, 23 and 33 are arranged to implement steps of the subscription profile installation method described previously, executed by the terminal 10 and the elements 20 and 30. They are preferably software modules containing software instructions to have these steps executed. The present invention therefore relates also to:

a program comprising program instructions intended to control the execution of the steps of the installation method described previously which are executed either by the terminal 10, or by the server 20, or by the server 30, when this program is executed by the processing module 13, 23 or 33 of one of these elements;

a storage medium that can be read by a processing module 13, 23 or 33, on which the above program is stored.

The software modules can be stored in or transmitted by a data medium. The latter can be a hardware storage medium, for example a CD-ROM, a magnetic diskette or a hard disk, or even a transmission medium such as an electrical, optical or radio signal, or a telecommunication network.

Obviously, the invention is not limited to the above embodiments described and represented, from which other exemplary embodiments and other forms will be able to be provided without in any way departing from the scope of the invention.

Thus, the use of an intermediate discovery server, the checking of an OTP code on one or other of the servers involved, the use of indicators of availability of a profile to be loaded, as presented previously, are not limited to the embodiments in which they are described and can perfectly well be combined within one and the same embodiment.

The invention claimed is:

1. A method for installing a subscription profile, taken out with an operator of a mobile telecommunication network, on a mobile communication terminal containing an embedded subscriber identification module, comprising:

sending a name resolution request to a domain name server, said request comprising an identifier of a network element enabling the triggering of the loading of the profile, wherein the identifier of the network element takes the form of a name in DNS format of the "provisioning.platform.domain.ltd" type in which:
"provisioning.platform" is an identifier of the subdomain of the network in which a provisioning server is located,
"domain" is a registered identifier of the domain of the network in which the provisioning server is located, and
"ltd" is a generic identifier of the domain on which the provisioning server resides;
receiving, in response to said request, a response message containing a network address of said network element; and
sending a request to said network element by means of said network address in order to allow the triggering of the loading of the profile; and
after sending said request to said network element, loading the subscription profile into said embedded module from a provisioning server of the mobile telecommunication network.

2. The method of claim 1, wherein the network element enabling the triggering of the loading of the profile comprises the provisioning server and the request sent to said network element comprises a request to trigger the loading of the profile containing an identifier of the embedded module and/or of the mobile terminal.

3. The method of claim 2, further comprising receiving, from the embedded module, an identifier of said embedded module, the identifier of the provisioning server being constructed from at least a part of the identifier of said embedded module.

4. The method of claim 2, wherein the identifier of the provisioning server includes a one-time password, the method further comprising checking the one-time password by the domain name server and/or the provisioning server.

5. The method of claim 1, wherein the network element enabling the triggering of the loading of the profile comprises a discovery server distinct from the provisioning server and the request sent to said network element comprises a request to obtain information making it possible to send a request to trigger the loading of the profile to the provisioning server, the method further comprising:
receiving from the discovery server, in response to said request sent to said network element, of a response message containing said information; and
sending a request to trigger the loading of the profile to said provisioning server.

6. The method of claim 5, wherein the discovery server comprises a domain name server, the request to obtain information making it possible to send a request to trigger the loading of the profile to the provisioning server comprises a name resolution request containing an identifier of the provisioning server and the information comprises a network address of the provisioning server, the request to trigger the loading of the profile being sent by means of said network address.

7. The method of claim 5, wherein the request to obtain information contains an identifier of the embedded module and said information comprises an identifier of the provisioning server, the method further comprising:
sending, to the domain name server, a domain name resolution request containing the identifier of the provisioning server; and
receiving, in response to said resolution request, of a response message containing the network address of the provisioning server, the request to trigger the loading of the profile being sent by means of said network address.

8. A non-transitory computer readable medium comprising instructions, which when executed by a processor, cause the processor to perform the method of claim 1.

9. A computer having stored thereon instructions which, when executed by said computer, cause said computer to perform the method of claim 1.

10. A mobile communication terminal comprising an embedded subscriber identification module and a processing module capable of installing a subscription profile, taken out with an operator of a mobile telecommunication network, in the embedded module, the processing module configured to:
transmit a domain name resolution request comprising an identifier of a network server enabling the triggering of the loading of the profile, configured to be transmitted to a domain name server, wherein the identifier of the network server takes the form of a name in DNS format of the "provisioning.platform.domain.ltd" type in which:
"provisioning.platform" is an identifier of the subdomain of the network in which a provisioning server is located,
"domain" is a registered identifier of the domain of the network in which the provisioning server is located, and
"ltd" is a generic identifier of the domain on which the provisioning server resides; and
following the reception of a message in response to said resolution request containing a network address of a network element allowing the triggering of the loading of the profile, transmit a request to said network element in order to trigger the loading of the subscription profile from a provisioning server.

11. A domain name server comprising a storage module configured to store network addresses of elements in association with domain names and a processing module configured to consult said storage module, the processing module further configured to, following the reception of a domain name resolution request containing an identifier of a network element enabling the triggering of the loading of the profile, transmitted from a mobile communication terminal containing an embedded subscriber identification module:
check if a network address corresponding to said identifier is stored in the storage module; and
when the check is positive, transmit said network address to the mobile terminal to allow said terminal to transmit to said network element a request allowing the loading of a subscription profile from a provisioning server, wherein the identifier of the network element takes the form of a name in DNS format of the "provisioning.platform.domain.ltd" type in which:
"provisioning.platform" is an identifier of the subdomain of the network in which a provisioning server is located,
"domain" is a registered identifier of the domain of the network in which the provisioning server is located, and
"ltd" is a generic identifier of the domain on which the provisioning server resides.

12. A provisioning server comprising a storage module and a processing module configured to consult said storage module, the processing module further configured to, following the reception of a request to load a subscription profile transmitted from a mobile communication terminal comprising an embedded subscriber identification module, said request containing an identifier of the embedded module and/or of the terminal:
- check, by means of said identifier, if an indication that a subscription profile is available for the loading for said embedded module is stored in the storage module; and
- when the check is positive, transmit the subscription profile to the mobile terminal,
- when the check is negative, transmit to the mobile terminal a request for redirection to an internet portal enabling the selection of an offer of the operator of a mobile communication network, in order to transmit to the mobile terminal a subscription profile corresponding to this offer.

* * * * *